(12) United States Patent
Heidemann et al.

(10) Patent No.: US 9,217,637 B2
(45) Date of Patent: Dec. 22, 2015

(54) DEVICE FOR OPTICALLY SCANNING AND MEASURING AN ENVIRONMENT

(71) Applicant: FARO Technologies, Inc., Lake Mary, FL (US)

(72) Inventors: Rolf Heidemann, Stuttgart (DE); Martin Ossig, Tamm (DE); Rasmus Debitsch, Fellbach (DE); Gerrit Hillebrand, Waiblingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 254 days.

(21) Appl. No.: 13/767,175

(22) Filed: Feb. 14, 2013

(65) Prior Publication Data

US 2014/0168370 A1 Jun. 19, 2014

Related U.S. Application Data

(60) Provisional application No. 61/740,681, filed on Dec. 21, 2012.

(30) Foreign Application Priority Data

Dec. 14, 2012 (DE) .......................... 10 2012 112 322

(51) Int. Cl.
*G01B 11/24* (2006.01)
*G01B 11/25* (2006.01)
(Continued)

(52) U.S. Cl.
CPC ........ *G01B 11/2513* (2013.01); *G01B 11/2518* (2013.01); *G01B 11/24* (2013.01); *G01B 11/25* (2013.01); *G01C 11/00* (2013.01); *G01C 11/02* (2013.01)

(58) Field of Classification Search
CPC ....... G01S 17/023; G01S 11/00; G01S 11/06; G01S 11/24; G01S 11/25
USPC ............ 348/46, 136, 26; 382/154; 356/2, 601
See application file for complete search history.

(56) References Cited

U.S. PATENT DOCUMENTS

| 5,461,478 A | 10/1995 | Sakakibara et al. |
| 6,542,249 B1 | 4/2003 | Kofman et al. |

(Continued)

FOREIGN PATENT DOCUMENTS

| AT | 501507 | 9/2006 |
| AT | 506110 | 6/2009 |

(Continued)

OTHER PUBLICATIONS

German Office Action for DE102012112321.7 dated Dec. 14, 2012.
(Continued)

*Primary Examiner* — Jefferey Harold
*Assistant Examiner* — Omer Khalid
(74) *Attorney, Agent, or Firm* — Cantor Colburn LLP

(57) ABSTRACT

A method for optically scanning and measuring an environment by means of a hand-held scanner for producing 3D-scans is provided. The method including providing a hand-held scanner having at least one projector and at least one camera. At least one pattern is projected onto an object in the environment with the at least one projector. At least one camera images of the object which has the pattern projected thereon is recorded with a plurality of frames. Three-dimensional coordinates of points on the surface of the object are determined from each frame in the plurality of frames. A ring closure is determined in the plurality of frames. The determination comprising the steps of forming a frustum for each frame, comparing a last frustum of the last frame with a plurality of frusta to form an intersection, and selecting a frustum having the largest intersection.

14 Claims, 3 Drawing Sheets

(51) Int. Cl.
*G01C 11/00* (2006.01)
*G01C 11/02* (2006.01)

(56) References Cited

U.S. PATENT DOCUMENTS

| | | | |
|---|---|---|---|
| 7,069,124 | B1 | 6/2006 | Whittaker et al. |
| 7,256,899 | B1 | 8/2007 | Faul et al. |
| 7,336,375 | B1 | 2/2008 | Faul et al. |
| 8,384,914 | B2 | 2/2013 | Becker et al. |
| 8,971,612 | B2 * | 3/2015 | Shotton et al. ............... 382/159 |
| 2004/0119833 | A1 | 6/2004 | Duncan et al. |
| 2010/0046005 | A1 | 2/2010 | Kalkowski et al. |
| 2011/0282622 | A1 | 11/2011 | Canter |
| 2011/0288684 | A1 | 11/2011 | Farlow et al. |
| 2012/0146897 | A1 * | 6/2012 | Yoshida et al. ............... 345/156 |
| 2012/0194644 | A1 * | 8/2012 | Newcombe et al. ............ 348/46 |
| 2013/0060146 | A1 | 3/2013 | Yang et al. |
| 2013/0100282 | A1 | 4/2013 | Siercks et al. |
| 2013/0293684 | A1 | 11/2013 | Becker et al. |

FOREIGN PATENT DOCUMENTS

| | | |
|---|---|---|
| DE | 102004052199 | 4/2006 |
| DE | 102006049695 A1 | 4/2008 |
| DE | 202008013217 | 5/2009 |
| DE | 102009035336 | 11/2010 |
| DE | 112009001652 | 1/2012 |
| EP | 1211481 | 6/2002 |
| WO | 2006944409 | 9/2006 |
| WO | 2011134083 A1 | 11/2011 |
| WO | 2011160962 | 12/2011 |

OTHER PUBLICATIONS

German Patent Office Action for 102012112322.5 dated Dec. 14, 2012.
Brenneke et al: "Using 3D laser range data for slam in outsoor enviornments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.
International Search report of the International Application No. PCT/IB2013/003082 mailed Apr. 28, 2014.
Surman et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands.
Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.
Written Opinion of the International Searching Authority for International Application No. PCT/IB2013/003082 mailed Apr. 28, 2014.
Herbert P., "A self-referenced hand-held range sensor", 3-D Digital Imaging and Modeling, 2001, Proceedings, Third anual International Conference on May 28-Jun. 1, 2001, Piscataway, NJ, USA, IEEE, May 28, 2001, pp. 5-12.
Notification of Transmittal of the International Search Report and the Written Opinion of the International Searching Authority, or the Declaration; PCT/IB2013/003072; May 22, 2014, 11 pages.
International Search report of the International Application No. PCT/US2013/003077 mailed Jun. 26, 2014.
Karl, Granstroi M et al: "Learning to Close the Loop from 3-D Point Clouds." 2010 IEEE/RSJ International Conference on Intelligent Robots and Systems (IROS), Piscataway, NJ, Oct. 18, 2010, pp. 1-7.
Thibaut Weise et al.:"Online Loop Closure for real-time interactive 3-D scanning." Computer Vision and Image Understanding, vol. 115, No. 5, May 1, 2011, pp. 635-648.
Wonwoo Lee et al.:"Panoramic Mesh Model Generation From Multiple Range Data for Indoor Screen Reconstruction." Advances in Multimedia Information Processing, PCM Lecture Notes in Computer Science, Jan. 1, 2005, Berlin, DE, pp. 1004-1014.
P Henry et al: "RGB-D Mapping; Using Kinnect-style Depth Cameras for Dense 3-D Modeling of Indoor Enviornments." The International Journal of Robitcs Research, vol. 31, No. 5, Feb. 10, 2012, pp. 647-663.
May S. et al; "Robust 3-D Mapping with time-of-flight cameras." Intelligent Robots and Systems, IROS 2009. IEEE/RSJ Internation Conference. Piscataway, NJ Oct. 10, 2009, pp. 1-6.
Written Opinion of the International Searching Authority for International Application No. PCT/US2013/003077 mailed Jun. 26, 2014.

* cited by examiner

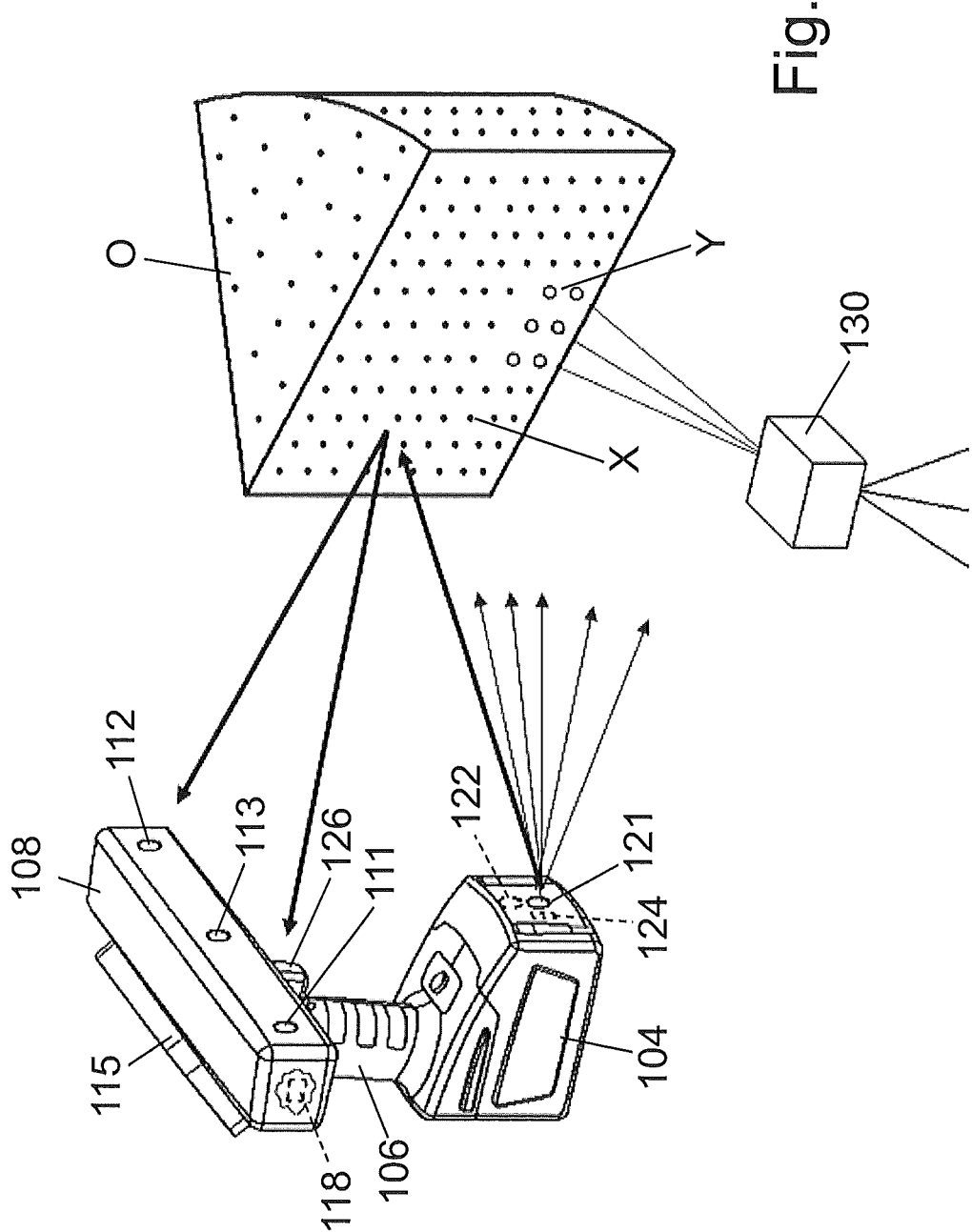

DEVICE FOR OPTICALLY SCANNING AND MEASURING AN ENVIRONMENT

CROSS REFERENCE TO RELATED APPLICATIONS (IF APPLICABLE)

The present application claims priority to German Patent Application Serial No. DE 10 2012 112 322.5 filed on Dec. 14, 2012 and to U.S. Provisional Application Ser. No. 61/740,681 filed on Dec. 21, 2012, the contents of both of which are incorporated herein in their entirety.

BACKGROUND OF THE INVENTION

The subject matter disclosed herein relates to a scanner for optically scanning an object and in particular to a scanner that utilizes an uncoded structured light pattern.

Scanners are devices that use noncontact optical techniques to obtain three-dimensional coordinate data of a surface of an object. The scanner typically includes a projector that projects light patterns on the surface. The position of the projector is determined by means of a projected, encoded pattern. Two (or more) cameras, the relative positions and alignment of which are known or are determined, can record images of the surface with a further, uncoded pattern. The three-dimensional coordinates (of the points of the pattern) can be determined by means of mathematical methods which are known per se, such as epipolar geometry.

From the games sector, scanners are known as tracking devices, in which a projector projects an encoded light pattern onto the target to be pursued, such as the user who is playing, in order to then record this encoded light pattern with a camera and to determine the coordinates of the user.

Systems have also been developed for scanning a scene, including distance measuring. The system, in its simplest form, comprises a camera unit with two cameras, optionally with filters, for the stereoscopic registration of a target area. An illumination unit is provided for generating an encoded pattern in the target area, such as by means of a diffractive optical element. This system also includes a synchronizing unit, which synchronizes the illumination unit and camera unit. Camera unit and illumination unit can be set up in selectable relative positions. Optionally, also two camera units or two illumination units can be used.

Accordingly, while existing scanners are suitable for their intended purposes, the need for improvement remains, particularly in providing a scanner that may acquire coordinate data using an uncoded light pattern while being moved.

BRIEF DESCRIPTION OF THE INVENTION

Scanners that use structured light to determine three dimensional coordinates typically use either encoded or uncoded patterns. Compared to an encoded pattern, an uncoded pattern can be produced more easily, for example as a regular pattern of light points. In embodiments of the invention, two (or more) cameras are used in order to record images of the object which the uncoded pattern is projected to get unambiguous correspondences of the light points of the pattern. The two cameras and the projector are arranged in a way that is not co-linear, but rather in a triangle arrangement. It is thus possible to use three epipolar-geometry-relations, in order to determine the correspondence between the patterns in the camera images. When these correspondences are known, the three-dimensional coordinates of the point cloud, i.e. the 3D-scan, can be determined.

In the exemplary embodiment, the uncoded pattern is not produced within the visible wavelength range, but within the infrared range (700 nanometers-1 millimeter). The two cameras have a corresponding sensitiveness in this wavelength range, while scattered light and other interferences can be filtered out in the visible wavelength range. A color camera can be provided as third camera for color information, such camera recording images of the object to be scanned, too. The three-dimensional (3D) scan can be colored with the color information thus obtained.

In the exemplary embodiment, the scanner is a portable hand-held scanner that produces a plurality of 3D-scans of the same scene from different positions. Registration of the different 3D-scans in a common coordinate system is facilitated by a stationary pattern, which can be captured by different 3D-scans. The stationary pattern rests with respect to the object, when the hand-held scanner is moved and takes the different positions. The natural texture of the surface of the object and other structures, such as edges, can be used as stationary pattern, such texture being captured by means of a color camera as third camera, or a projected pattern, which is produced by a separate (external) projector, is used (additionally or alternatively). This stationary pattern can be distinguishable in terms of geometry, time or spectrum from the pattern produced by the hand-held scanner.

In one embodiment, a modular design with three (or more) cameras and a plurality of projectors, by means of which requirements which depend on the application are fulfilled by projecting and recording images of patterns having different point densities and lateral resolution, is conceivable.

In embodiments of the invention, the production of the pattern can take place by means of deflecting methods, such as production by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

In embodiments of the invention, the hand-held scanner is designed as a portable scanner, i.e. it works at high speed and may be carried and operated by a single person. It is, however, also possible to mount the hand-held scanner on a tripod (or on another stand), on a manually movable trolley (or another cart), or on an autonomously moving robot, i.e. that it is not carried by the user. In one embodiment, the scanner is held stationary by using another housing, for example without grip part. The notion "hand-held scanner" must consequently have a wide interpretation, so that it comprises in general scanners which are configured as compact units and that may be moved by single person or mounted on a fixture.

In some embodiments of the invention, the operation of the hand-held scanner can, in a sequence of frames or in a video, entail a ring closure, in particular when an object O is circumnavigated. It is desirable that the ring closure be recognized automatically and used for correcting potential measuring errors. For this purpose, preferably one frustum each is formed for any frame out of the plurality of frames, such frustum containing a certain part of the points of the three-dimensional point cloud which represents the 3D-scan, which is determined from the frame and assigned thereto. The intersection of the frustum of the latest frame and of a plurality of the past frames is formed, wherein the past frustum having the major intersection is chosen. The ring closure can be recognized by means of searching, comparing and identifying features.

In order to reduce the amount of data to be saved and/or transferred by the hand-held scanner (in a post-processing) an averaging may be performed via adjacent frames, such as by dividing the two-dimensionally structured amount of data up into groups of frames and averaging by means of the frames of the group.

According to yet another aspect of the invention, a method for optically scanning and measuring an environment by means of a hand-held scanner for producing 3D-scans is provided. The method including providing a hand-held scanner having at least one projector and at least one camera. At least one pattern is projected onto an object in the environment with the at least one projector. At least one camera images of the object which has the pattern projected thereon is recorded with a plurality of frames. Three-dimensional coordinates of points on the surface of the object are determined from each frame in the plurality of frames. A ring closure is determined in the plurality of frames. The determination comprising the steps of forming a frustum for each frame, comparing a last frustum of the last frame with a plurality of frusta to form an intersection, and selecting a frustum having the largest intersection.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 shows a schematic illustration of the device,

Figure 4:
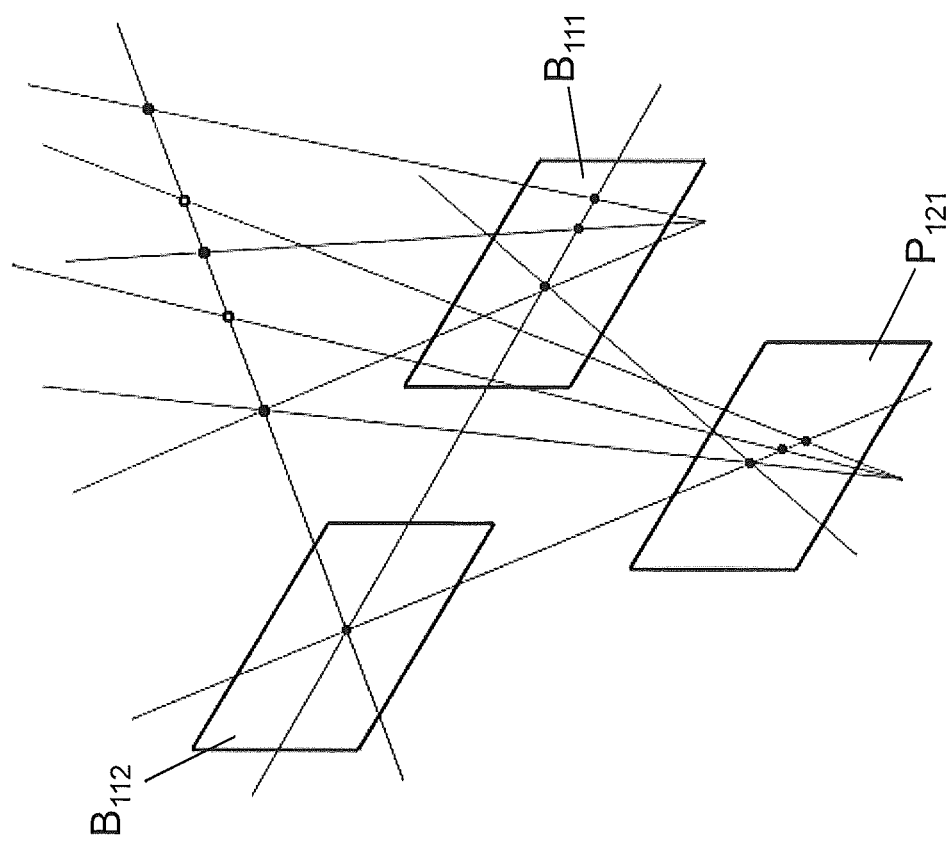
FIG. 4 shows a schematic illustration of projector plane, image plans and epipolar lines.
Figure 2:
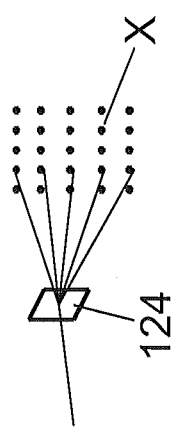
FIG. 2 shows a schematic illustration of the production of a pattern by means of a diffractive optical element.
Figure 3:
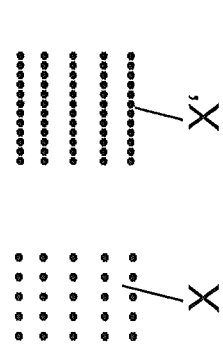
FIG. 3 shows a pattern and another pattern.

The detailed description explains embodiments of the invention, together with advantages and features, by way of example with reference to the drawings.

DETAILED DESCRIPTION OF THE INVENTION

Referring now to FIG. 1, a scanner 100 is provided as portable part of a device for optically scanning and measuring an environment of the scanner 100. The scanner 100 has a base part 104, a grip part 106, which protrudes from the base part 104 and a head end 108, which is provided on the grip part 106. A user of the scanner 100 can hold the scanner 100 at the grip part 106 and to align the scanner 100 toward the objects O.

A first camera 111 and a second camera 112 are arranged in the head end 108, spaced apart at a predetermined distance to each other. The alignments of the first camera 111 and of the second camera 112 to each other are adjusted or adjustable in such a way that the fields of view overlap and stereoscopic images of the objects O are possible. If the alignments are fixed, there is a desirable overlapping range for a particular application. With regard to precision, an overlapping range similar to the projector-camera distances would be desirable. Depending on typical environment situations, also a range of several decimeters or meters may be desired. In an embodiment, the alignments can be adjusted by the user, for example by pivoting the cameras 111 and 112 in opposite sense, about axes of rotation that are parallel to the grip part 106. The alignment can be known to the scanner 100 at any time, if the adjusting process of the user is tracked, or the alignment is initially at random (and unknown), and is then made known to the scanner 100 by calibration.

The first camera 111 and the second camera 112 may monochrome (i.e. sensitive to a narrow wavelength range). For example the cameras 111, 112 may be monochrome by being provided with corresponding filters, which then filter out other wavelength ranges, including scattered light. It is desirable that this narrow wavelength range be within the infrared range. In order to obtain color information on the objects O, a color camera 113 may be arranged in the head end 108. In one embodiment, the color camera 113 is symmetrically aligned to the first camera 111 and to the second camera 112, and arranged centrally therebetween. The color camera 113 is thus sensitive in the visible wavelength range.

The scanner 100 may have a display and control unit 115. In one embodiment, the display and control unit 115 is configured as a touch screen. The display and control unit 115 is arranged at the head end 108, on the side facing away from the cameras 111, 112 and in some embodiments color camera 113. The display and control unit 115 can be configured to be detachable. The cameras 111, 112, 113, as well as the display and control unit 115 may be connected to a control and evaluation unit 118, which is arranged in the head end 108. The control and evaluation unit 118 may pre-process the data of the cameras 111, 112, 113. In one embodiment, the display and control unit 115 may provide a visual display of 3D-scans images. In another embodiment, the display and control unit 115 is omitted and the scanner 100 is operated by means of a remote control unit, such as from a stationary or from a portable computer (PC, tablet, smartphone or the like) for example. This remote control unit is under substantially continuous connection (cabled or wireless) with the control and evaluation unit 118.

Data from the control and evaluation unit 118 may be transferred by means of radio communication (for ex-ample by means of WLAN to a stationary computer) or a wired data connection, such as on the base part 104 for example. The wired data connection may be, for example, a standardized interface for LAN, USB or the like, or another interface, as is described in commonly owned United States Patent Publication 2010/0113170 entitled "Interface" which is incorporated herein by reference. In one embodiment, the data connection can be configured to provide a portable storage medium (SD-card, USB-stick etc.). In one embodiment, the power is supplied to the scanner 100 by a battery arranged in base 104. An outlet may be provided for charging the battery. In one embodiment, the battery may be interchangeable.

From the images recorded by the first camera 111 and by the second camera 112, three-dimensional data can be determined, such as in the control and evaluation unit 118 for example. Thus the 3D-coordinates of point on the objects O may be produced, such as by means of photogrammetry for example. It should be appreciated that objects O may have few structures and many smooth surfaces, so that generation of 3D-scans from the scattered light of the objects O is difficult.

In one embodiment, a first projector 121 is therefore provided, which is configured in the base part 104 or the head end 108 and aligned in correspondence with the two cameras 111, 112. The relative distance and the relative alignment are preset or can be set by the user. The first projector 121 projects a pattern X onto the objects O to be scanned. The pattern X does not need to be encoded (that is to say single-valued), but it is uncoded, for example periodically, that is to say multivalued. The multivaluedness is resolved by the use of the two cameras 111, 112.

In the exemplary embodiment, the uncoded pattern X is a point pattern comprising a regular arrangement of points in a grid. This grid pattern may be one hundred times one hundred points that are projected at an angle of approximately 50° to a distance of approx. 0.5 m to 5 m. The pattern X may also be a line pattern or a combined pattern of points and lines, each of which is formed by tightly arranged light points. The two cameras 111, 112 project the pattern X in their respective image planes B111, B112, in each of which one photo sensor (for example CMOS or CCD) is arranged, in order to record the pattern X.

There is a relationship between the point density, the distance between the first projector 121 and the object and the resolution that can be obtained with the produced pattern X. If only single images are available, fine structures of the object O can be examined with a higher point density, and coarse structures are examined with low point densities. It therefore desirable to be able to produce, in addition to pattern X, at least one other pattern X'. Depending on the production of the patterns X, X', a dynamic transition between the patterns and/or a spatial intermingling is possible. This allows the point density to be adapted to the structures of the object O.

In one embodiment a second projector 122, which is aligned correspondingly and can produce the other pattern X', is configured in addition to the first projector 121. In other embodiments, the first projector 121 can also produce, in addition to pattern X, the other pattern X', such as by offsetting the patterns relative to each other with respect to time and/or in another wavelength range. The second pattern X' may be a pattern which deviates from pattern X, such as a point pattern with a regular arrangement of points having another distance (grid length) to each other for example.

In another embodiment, the second pattern X' constantly interferes with pattern X, for example with a different intensity. The first pattern X thus has a first plurality of light points having a higher intensity at larger distances and in between them, a second plurality of light points having a lower intensity with smaller distances for example. With pattern X having different intensities, the limited camera dynamics (if the exposure time is given, the light points are visible without overexposure/underexposure only in a limited, combined distance and reflectivity area) can be overcome, and a larger dynamics range for depth and intensity can be covered. It should be appreciated that pattern X may have a higher periodicity, but it is still considered an uncoded pattern within the context of embodiments of the invention.

It is further conceivable that more than two patterns X, X' may be used, for ex-ample a defined sequence of a plurality of patterns, which are produced, for example, subsequently with regard to time.

As discussed above, in the exemplary embodiment, the patterns are monochromatic. These monochromatic pattern(s) X (and X') are produced by means of a diffractive optical element 124, which divides a light beam produced by a laser in the wavelength range (infrared) of the two cameras 111, 112 in correspondence with the pattern X, without losing intensity. The lateral resolution is then limited only by the beam diameter (i.e. the size of the points). Since the pattern(s) X (and X') are produced within the infrared range, it is possible to both record the images of the color camera 113 without interference and to avoid safety measures to protect eyes or the like. For the same purpose, the pattern X (and X') could alternatively be produced in the ultraviolet range.

The two patterns X and X' may also be produced with two diffractive optical elements, which are screened at different times or with different wavelengths. With a time-variable diffractive optical element, it is possible to quickly (i.e. with approximately each frame) or slowly (for example manually controlled) change between the patterns X and X', or pattern X can be adapted dynamically to the changing facts (with regard to the density of the light points and the reach of the projected pattern X). A gradual transition between the patterns X and X' is conceivable as well (fade-over). As an alternative to diffractive optical elements, arrays of microlenses or of single lasers can be used. Optionally, also a classical imaging by means of a mask, in particular of a transparency, is possible.

For reasons of energy efficiency and eye safety, the (first) projector 121 produces the pattern X on the objects O only, when the cameras 111, 112, 113 record images of the objects O which are provided with the pattern X. For this purpose, the two cameras 111, 112 and the projector 121 (and if available the second projector 122) are synchronized (i.e. coordinated internally with each other) with regard to both, time and the pattern X used (and, if available, X'). In the exemplary embodiment, each recording process starts by the first projector 121 producing the pattern X on to the object O, similar to a flash in photography, and the cameras 111, 112, 113 capturing the images of light reflected off of the object O. Pairs of records (frames), one image each from each of the two cameras 111, 112 is obtained and a single image from the color camera 113. The recording process can comprise one single frame (shot), or a sequence of a plurality of frames (video). A trigger switch 126, by means of which such a shot or such a video can be triggered, is provided such as at the grip part 106 for example. After processing of the data, each frame then constitutes a 3D-scan, i.e. a point cloud in the three-dimensional space containing three-dimensional coordinates of points on the object O, in relative coordinate reference system of the scanner 100. In another embodiment, the recording process can be triggered by means of the above-named remote control unit.

In one embodiment, the first projector 121 and the second projector 122 are not arranged co-linear to the two cameras 111, 112, but in a triangle arrangement. This arrangement of the two cameras 111, 112 and the projectors makes the use of mathematic methods of optics, which are known per se, as epipolar geometry, according to which one point in the image plane B112 of the second camera 112 can be observed on a known line, namely the epipolar line e, in the image plane B111 of the first camera 111, and vice versa, or a point which is produced by the first projector 121 from a projector level P121 can be observed on one epipolar line e each, in the image planes B111, B112 of the two cameras 111, 112.

In the exemplary at least three units, (projector 121 and the two cameras 111 and 112) are involved (i.e. proceeding from each of the units), two stereo geometries each (with plenty of epipolar lines e each) can be defined with the two other units. Thus unambiguous triangle relations of points and epipolar lines e, from which the correspondence of projections of the pattern X (and X') in the two image levels B111, B112 may be determined. Due to the additional stereo geometry (compared to a pair of cameras), considerably more of the points of the pattern, which otherwise cannot be distinguished, can be identified on an epipolar line e. The density of features can thus simultaneously be high, and the size of the feature can be kept very low. It should be appreciated that with other methods using encoded patterns, the size of the feature has a lower limit, limiting the lateral resolution. If the correspondence has been determined, the three-dimensional coordinates of the points on the surface of the object O are determined for the 3D-scan by using triangulation principles.

In an embodiment, additional three-dimensional data may be gained by means of photogrammetry from several frames with different camera positions, for example from the color camera 113 or from the part of the signal of the cameras 111,112, which comes from the ambient light (i.e. from the natural texture of the environment). It can also be advantageous, if the scanner 100 or another unit can illuminate the object O, for example with white light or infrared light, such that not only the parts of the object O which are illuminated by the pattern O are visible, but also areas which are in between. In one embodiment, this illumination also illuminates the background. Such illumination of the object I is particularly suitable, if the data of the color camera 113 shall be used already for making the 3D-scans (and not only for the coloration thereof), and for calibrating the cameras 111, 112, if filters are used to allow the capture of only a limited spectral range.

The scanning process also shows an aspect of time. Whereas, with stationary devices, a whole sequence of patterns can be projected and images be recorded in order to determine one single 3D-scan, one 3D-scan is produced with each shot of the scanner 100. If a second projector 122 or a further diffractive optical element 124 or at least a second pattern X' in addition to pattern X is provided for, it is possible by means of a suitable switching over to also record with one shot images with different patterns X and X' consecutively. Thus the 3D-scan will be performed at a higher resolution.

In order to obtain a 3D-scan of the object O, each shot/frame must be registered, in other words the three-dimensional coordinates obtained in each frame must be inserted in a common coordinate system. Registration is possible, for example, by videogrammetry, i.e., for example, "structure from motion" (SFM) or "simultaneous localisation and mapping" (SLAM). The natural texture of the objects O can also be used for common points of reference, or a stationary pattern Y can be produced. The natural texture can be captured by the color camera 113 in addition to obtaining the color information.

In one embodiment, the separate projector 130 projects the stationary pattern Y onto the objects to be scanned (i.e. a pattern similar to pattern X or X'). While pattern X and X' moves with the scanner 100, the pattern Y remains stationary relative to the scanner 100. Thus shots/frames of coordinate data are acquired from different positions in a common coordinate system. Since stationary pattern Y is visible in a plurality of images (frames) acquired by the cameras 111, 112, the 3D-scans may be registered in relation to each other by means of the stationary pattern Y. The stationary pattern Y differs from pattern X and X' with regard to geometry or time or spectrum (or a combination thereof). If it differs with regard to time, the stationary pattern Y is produced at least in intervals of time, in which the pattern X and optionally X' is not produced (alternating or overlapping). If it differs with regard to spectrum, the stationary pattern Y is within another wavelength range as pattern X and optionally X', so that the cameras 111 and 112 may be sensitive (i.e. provided with corresponding filters) for the wavelength spectrum of pattern Y. The separate projector 130 may be synchronized with the scanner 100, such that the time and kind of the projected stationary pattern Y are known to the scanner 100.

Depending on the object O to be scanned, it might be appropriate, after a plurality of 3D scans have been made, to take the separate projector 130 to another side of the object O, such as an opposing side for example. This allows the projector 130 to project a stationary pattern Y onto the surface from a different angle and shaded areas can thus be avoided. It is therefore desirable that the separate projector 130 be portable or movable and is correspondingly mounted, for example, on a tripod or on a trolley (or another cart) or can be mounted thereon. In one embodiment, a plurality of separate projectors 130 is used in order to avoid shadowing features on the object I. A corresponding building-block system is possible.

In one embodiment, automation is possible, i.e. the scanner 100 is mounted on a manually movable trolley (or on another cart), or on an autonomously moving robot, or can be mounted thereon. The scanner 100, which is no longer carried by the user, scans its environment in a defined manner by producing a video than by producing a sequence of shots. Cameras and projectors may not be arranged in a co-linear manner.

Figure 5:
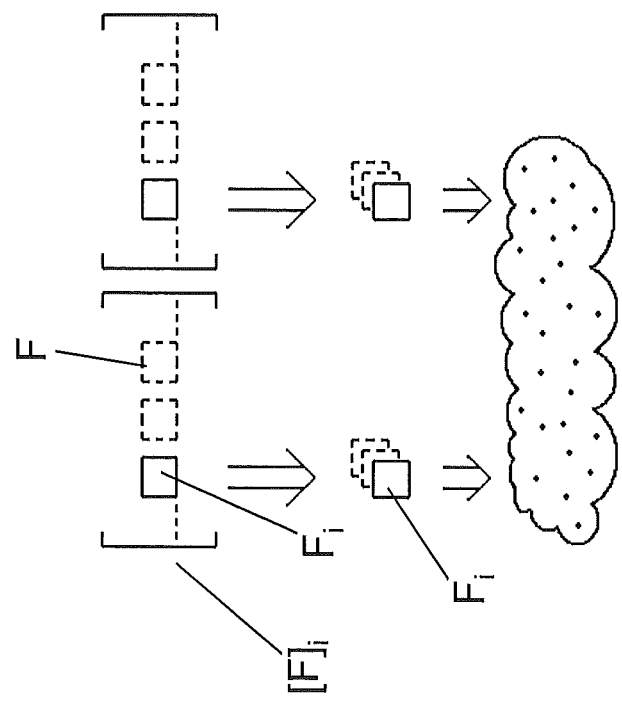
FIG. 5 shows a schematic illustration of an averaging.

In an embodiment, the scanner 100 can produce a video with a high density of frames, for example seventy (70) frames per second. Since the scanner 100, only moves a short distance between two frames, the video contains redundant information: two frames which are adjacent with regard to time, differ only very slightly. In order to reduce the amount of data to be saved and/or to be transferred, suitable averagings in a post-processing may be used (FIG. 5). In a first averaging step, the frames F are divided into groups [F]i, with a plurality of frames per group [F]i around one key frame Fi each.

So-called voxels, which completely fill space as the sum of single volume elements, are known from 3D-computer graphics. Such structures are frequently used in order to unite three-dimensional data from different perspectives in one point cloud. A disadvantage when recording surface data are the many remaining empty voxels, which must be processed in terms of data in some way.

In embodiments of the invention, data structures which are adapted to the problem may be used. Within a group [F]i of considerably overlapping frames F, single measuring points still can be summarized very well and efficiently in a common two-dimensional data structure (grid structure), such as being optimized for surface data and very similar to a two-dimensional image for example. The smaller storage capacity required permits to initially save all captured measured values as a vector in the two-dimensional data structure, such as gray-tone value/color and distance to the scanner 100 for each of the pixels of the frames F of the group [F]i for example.

In a second averaging step, an averaging takes place within each group [F]i, in order to very simply eliminate faulty measurements. For such averaging (with regard to gray tones/colors and/or distances), only a defined part of the vector within the central range of the sorted measured values is taken. The central range can be distinguished by means of threshold values. Such averaging corresponds to a replacement of the group [F]i by a key frame Fi with averaged measured values, wherein the key frames Fi still show considerable overlapping. Each measuring point which is gained in such a way is then carried on as a point (corresponding to a three-dimensional vector) of the three-dimensional overall point cloud.

In one embodiment, a third step is used where the measuring points gained by averaging can be brought together with data from another group [F]i, such as by Cartesian averaging for example.

Figure 6:
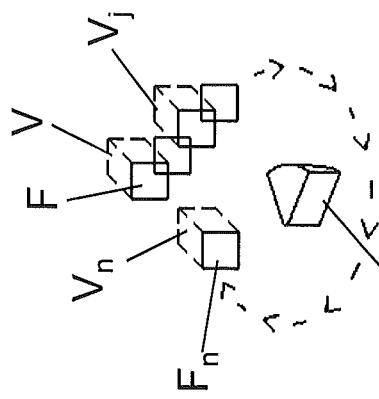
FIG. 6 shows a schematic illustration of a ring closure.

Operation of the scanner 100 entails, in particular when an object O is circumnavigated, that a ring closure might occur, i.e. after acquiring a series of frames, the video (or the sequence of shots) shows the same or at least a very similar view. The ring closures could be recognized immediately, if it were possible to look at all available data, at any time during the acquisition of the overall point cloud. The amount of data and the computing time resulting therefrom, however, doesn't typically allow this. A method is may be provided, by means of which it can be rapidly determined, which data from earlier frame sequences is analyzed, due to the ring closure. If all measurements were completely without faults (and the movement of the scanner 100 were sufficiently regular), the ring closure would immediately result from the registration of the 3D-scan in the common coordinate system. However, typically a fault in the data set result in an offset of two similar frames F and the resulting 3D scans. A possibility of automatically recognizing the ring closure nevertheless (and to correct the data fault), is described in the following (FIG. 6).

A frustum (more precisely: viewing frustum) usually is a truncated-pyramid-shaped area of space, which extends from the image plane, in correspondence with the viewing direction, into the infinite. In one embodiment, a frustum V is formed for each frame in a first step, such frustum comprising (at least approximately) 80% of the captured points from the three-dimensional point cloud (i.e. a finite part of the area of space of the assigned 3D scan), which is determined from the frame F. The latest frustum Vn is assigned to the latest frame Fn, which was recorded last. In a second step the latest frustum Vn is then compared to the past frusta V by forming the intersection. The frustum out of the past frusta Vj, with which there is the largest intersection, is selected for carrying out an exacter analysis.

In a third step, within the latest frustum Vn and the selected frustum Vj each, features, for example edges and corners, are looked for in a manner known per se. In a fourth step, the detected features are compared to each other, for example with regard to their embedded geometry, and the coinciding features are identified. Depending on the degree of coincidence, it is determined in a fifth step, whether there is a ring closure or not.

The identification of the ring closure allows common features to be generated from the identified, coinciding features. By means of methods known under the denomination "bundle adjustment", the error of measurement can be corrected in a sixth step. For example, the 3D scans may be corrected up to a defined depth of penetration into space. The three-dimensional point cloud may be in some places and to a certain degree displaced, so that an offset is eliminated in the frames, 3D scans and frusta which are per se identical. If correction is not completely possible after this sixth step (with the "bundle adjustment"), a certain deviation of data and consequently a certain error of measurement which cannot be corrected will still remain. This deviation (i.e. the error which cannot be corrected) is a measure for the quality of the measurements and of the data as a whole.

The movement of the scanner 100 and registration of the acquired frames and coordinate data may be determined by tracking where the scanner 100 tracks the relative movement of its environment. If tracking gets lost, for example, if the scanner 100 has been moved too fast, there is a simple possibility of re-assuming tracking. For this purpose, the latest video image, as it is provided by the color camera 113, and the last video still image from tracking provided by it, are represented side by side (or one above the other) on the display and control unit 115 for the user. The user may then move the scanner 100 until the two images coincide.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for optically scanning and measuring an environment by means of a hand-held scanner for producing 3D-scans, the method comprising:
   providing a hand-held scanner having at least one projector and at least one camera;
   projecting at least one pattern onto an object in the environment with the at least one projector;
   circumnavigating the object with the hand-held scanner and recording with the at least one camera images of the object which has the pattern projected thereon with a plurality of frames;
   determining three-dimensional coordinates of points on the surface of the object from each frame in the plurality of frames; and
   determining a ring closure in the plurality of frames following the circumnavigation of the object, the determination comprising the steps of:
   forming a frustum for each frame;
   comparing a last frustum of the last frame with a plurality of frusta to form an intersection;
   selecting a frustum having the largest intersection.

2. The method according to claim 1, wherein:
   each of the images includes geometric features of the object; and
   the step of selecting the frustum with the largest intersection includes comparing geometric features in the last frustum of the last frame with the selected frustum.

3. The method according to claim 2, further comprising:
   comparing the geometric features in the last frustum of the last frame with the selected frustum; and
   identifying coinciding geometric features in the last frustum of the last frame with the selected frustum.

4. The method according to claim 3, further comprising determining a ring closure based at least in part on the degree of correspondence between geometric features in the last frustum of the last frame with the selected frustum.

5. The method according to claim 4, further comprising:
   determining an error of measurement from the correspondence of the geometric features in the last frustum of the last frame with the selected frustum; and
   correcting the error of measurement in the last frustum of the last frame with the selected frustum to a predetermined penetration depth.

6. The method according to claim 5, further comprising generating a quality measurement metric when the error of measurement cannot be corrected.

7. The method according to claim 1, wherein each of the plurality of frusta contains at least approximately 80% of the three-dimensional coordinates from the plurality of frames.

8. The method according to the term of claim 1 further comprising performing an averaging via adjacent frames.

9. The method according to claim 8, wherein the step of averaging includes a first averaging step wherein the frames are divided into groups and are saved within each group as a vector in a common two-dimensional data structure.

10. The method according to claim 9, wherein the step of averaging further includes a second averaging, the second averaging being performed within each group via a defined share of the vector.

11. The method according to claim 10 wherein the second averaging for each vector takes place with regard to the gray tones or colors.

12. The method according to claim 10 wherein the second averaging for each vector takes place with regard to the distances.

13. A method for optically scanning and measuring an environment by means of a hand-held scanner for producing 3D-scans, the method comprising:
   providing a hand-held scanner having at least one projector and at least one camera;
   projecting at least one pattern onto an object in the environment with the at least one projector;
   recording with the at least one camera images of the object which has the pattern projected thereon with a plurality of frames;
   determining three-dimensional coordinates of points on the surface of the object from each frame in the plurality of frames; and
   determining a ring closure in the plurality of frames, the determination comprising the steps of:
      forming a frustum for each frame;
      comparing a last frustum of the last frame with a plurality of frusta to form an intersection; and
      selecting a frustum having the largest intersection;
   wherein:
   each of the images includes geometric features of the object; and
   the step of selecting the frustum with the largest intersection includes comparing geometric features in the last frustum of the last frame with the selected frustum;
   and further comprising:
   comparing the geometric features in the last frustum of the last frame with the selected frustum;
   identifying coinciding geometric features in the last frustum of the last frame with the selected frustum;
   determining the ring closure based at least in part on the degree of correspondence between geometric features in the last frustum of the last frame with the selected frustum;
   determining an error of measurement from the correspondence of the geometric features in the last frustum of the last frame with the selected frustum; and
   correcting the error of measurement in the last frustum of the last frame with the selected frustum to a predetermined penetration depth.

14. A method for optically scanning and measuring an environment by means of a hand-held scanner for producing 3D-scans, the method comprising:
   providing a hand-held scanner having at least one projector and at least one camera;
   projecting at least one pattern onto an object in the environment with the at least one projector;
   recording with the at least one camera images of the object which has the pattern projected thereon with a plurality of frames;
   determining three-dimensional coordinates of points on the surface of the object from each frame in the plurality of frames; and
   determining a ring closure in the plurality of frames, the determination comprising the steps of:
      forming a frustum for each frame;
      comparing a last frustum of the last frame with a plurality of frusta to form an intersection;
      selecting a frustum having the largest intersection;
   and further comprising:
   performing an averaging via adjacent frames wherein the averaging includes a first averaging step wherein the frames are divided into groups and are saved within each group as a vector in a common two-dimensional data structure.

* * * * *